(12) United States Patent
Fuchs

(10) Patent No.: US 10,512,927 B2
(45) Date of Patent: Dec. 24, 2019

(54) THREAD DOSING FEEDER FOR EXTRACTING CREAMS

(71) Applicant: F + K Innovationen GmbH & Co. KG, Baden-Baden (DE)

(72) Inventor: Karl-Heinz Fuchs, Radolfzell (DE)

(73) Assignee: F + K Innovationen GmbH & Co. KG, Baden-Baden (DE)

( * ) Notice: Subject to any disclaimer, the term of this patent is extended or adjusted under 35 U.S.C. 154(b) by 0 days.

(21) Appl. No.: 15/226,956

(22) Filed: Aug. 3, 2016

(65) Prior Publication Data
US 2017/0036225 A1 Feb. 9, 2017

(30) Foreign Application Priority Data

Aug. 3, 2015 (DE) .................. 10 2015 112 725
Jul. 13, 2016 (DE) .................. 10 2016 112 891

(51) Int. Cl.
*B05B 11/00* (2006.01)
*B65D 35/40* (2006.01)
*B65D 47/30* (2006.01)
*G01F 11/02* (2006.01)

(52) U.S. Cl.
CPC ........ *B05B 11/3028* (2013.01); *B05B 11/307* (2013.01); *B65D 35/40* (2013.01); *B65D 47/30* (2013.01); *G01F 11/02* (2013.01)

(58) Field of Classification Search
CPC ........................... B65D 35/40; B05B 11/3028
USPC .......... 222/92, 368, 367, 444, 450, 452, 207
See application file for complete search history.

(56) References Cited

U.S. PATENT DOCUMENTS

| | | | | |
|---|---|---|---|---|
| 1,975,154 A * | 10/1934 | Jordan | ............ | B65D 35/40 222/219 |
| 2,200,117 A * | 5/1940 | Milbank | ............ | B65D 35/40 222/322 |
| 6,279,783 B1 * | 8/2001 | Brown | ............ | B65D 47/2031 220/203.19 |
| 2005/0121472 A1 * | 6/2005 | Wessels | ............ | B65D 35/40 222/362 |
| 2015/0329246 A1 | 11/2015 | Fuchs | | |
| 2016/0244222 A1 * | 8/2016 | Sterling | ............ | B65D 47/2031 |

FOREIGN PATENT DOCUMENTS

WO 2014072418 A1 5/2014

OTHER PUBLICATIONS

Machine Translation of Fuchs (WO 2014072418) from www.wipo.int.*

* cited by examiner

*Primary Examiner* — Jeremy Carroll
(74) *Attorney, Agent, or Firm* — Bachman & LaPointe, PC

(57) ABSTRACT

A thread dosing feeder for extracting creams or gelatinous products contained within a tube from the tube whereby the dosing feeder tube can be applied to the tube, the thread dosing feeder comprises a rotary gate feeder (1), the rotary gate feeder (1) has a metering chamber, the metering chamber operates in conjunction with a plunger (3), the rotary gate feeder (1) is pivot-mounted on the thread dosing feeder and the thread dosing feeder has an outlet, and the thread dosing feeder has a re-circulation valve (11, 14, 20), the rotary gate feeder (1) has a concave finger receptor and is formed in one piece, whereby the metering chamber is locked and has an intake and discharge valve (6).

9 Claims, 14 Drawing Sheets

THREAD DOSING FEEDER FOR EXTRACTING CREAMS

BACKGROUND OF THE INVENTION

The invention is a thread dosing feeder for extracting creams.

Items known from the prior art include metering pumps for bottles, however they always operate by means of a displacing plunger and collar with activating and retracting springs and intake and discharge valves and are not suitable for squeezing via the tube wall.

Thread dose feeding from the tube is achieved by varying the tube outlet, whereby the line is always cut at different lengths. The desired extracting length can only be estimated, whereby the person's feeling and sense of proportion are usually mistaken in such a way that the user does not receive the precise, desired dosing quantity from the tube.

The object of the invention is to generate a metering dispenser for tubes whereby use of the handling of tube output should be integrated into the metering sequence. Creams and gelatinous products should be extracted in metered doses by squeezing the wall of the tube in order to avoid over- or underdosing and to guarantee the established tube handling for the user.

Patent application WO 2014/072418 A1 has already proposed a system that meets the requirements. The new application augments that application and, with a different construction with additional sealing elements, should illustrate the possibility of different production variants with a high degree of product protection and user-friendliness, whereby the sealing and re-circulation functions have been set in the tube neck. In connection with this, the disclosures of WO 2014/072418 A1 is incorporated herein by reference and should be regarded as part of the disclosure of this application.

SUMMARY OF THE INVENTION

The object of the present invention is obtained by providing a metering dispenser for tubes according to the invention which has a dispenser construction that can process all media that can be extracted via a tube.

In principle, the metering dispenser system is assembled in two parts, i.e., there is an extraction element in the form of a metering and sealing body as well as the tube with the discharge valve and the re-circulation valve.

The subassemblies are separably connected with each other via a spring lock or a screw plug, whereby the linkage is designed in such a way that metering function only operates in combination with both subassemblies.

In connection with this, the content of the tube or squeeze bottle is an ancillary factor.

In order to offer different dosages and lengths of line, the system is produced in different dosing chamber sizes.

The equipment of the invention serves to meter and extract creams or gelatinous products. These may be medications, cosmetics, adhesives, silicon, or other cream-like products. These products are preferably provided as tube content in a tube or squeeze bottle.

The dispenser of the invention represents the subassembly that can be mounted on a tube or squeeze bottle. In this context, mountable means that the rotary gate feeder subassembly on the tube or squeeze bottle is screwed, snapped, or clinched onto the tube or squeeze bottle or can otherwise be mounted.

The dispenser of the invention has an activating wheel that has T-shaped geometry, contains the dosing chamber, and is pivot-linked to the fastener element via an axis intake. The rotary gate feeder with the cylindrical or square, centrally located metering chamber is adjusted to the product to be extracted with respect to the size, scale, volume, or surface texture of the metering chamber.

In order to twist and operate the rotary gate feeder in a user-friendly manner, twisting aids may be provided on the rotary gate feeder in the form of concave or convex geometrical elements such as a concave finger receptor (FIG. 9).

The metering chamber interacts with a plunger that has a spherical or cylindrical shape. This means that the product in the metering chamber that is squeezed out of the tube moves the plunger in the direction of its outlet in the rotary gate feeder, then the rotary gate feeder is manually turned 180° so that the product can be pressed out of the tube with the next usage. In the process, the plunger with the product is shifted back to the outlet in the rotary gate feeder and is available to the user.

In this state, the plunger is sealed in the area of the product outlet.

Discharge and intake valves are fixed and snapped into place at each end of the metering chamber in order to restrict the plunger stroke and to additionally safeguard the product from the atmosphere with the closed geometry.

In the open valve variant without closed inlet and outlet openings, the plunger seals the metering chamber by means of the seal seat in the intake and discharge valves.

In order to ensure additional sealing and guaranteed shearing of the product thread, an additional part with a circumferential sealing and shearing edge can be inserted into the re-circulation valve, or check valve, for the purpose of shearing off the extracted product thread upon turning the rotary gate feeder when the two subassemblies in the metering chamber are in their assembled state.

In the variant with the slotted intake valve, the metering chamber opens near the product feed stream out of the tube and closes once the chamber is full or the product stream out of the tube subsides.

In the variant with the slotted discharge valve, the valve opens when the plunger pushes the product before it out of the metering chamber and closes when the plunger stroke is finished or the product is no longer flowing.

Depending on the position of the rotary gate feeder, the function of the valve as an intake or discharge valve changes, which means that the valve opens as an inlet into the chamber or as an outlet out of the chamber into the atmosphere.

The material of the two identically constructed valves consists of soft, flexible plastic.

The one-piece rotary gate feeder is equipped with the two intake and discharge valves as well as a plunger with a spherical or cylindrical geometry.

The pre-installed rotary gate feeder is pivot-installed in the side walls of the tube or bottle closure, whereby the center of the tube or bottle closure's rotation is snapped into place in the hub of the rotary gate feeder, thereby producing a non-detachable connection.

The rotary gate feeder can also be composed of two basins, whereby the basin separation is visible on the outer area of the rotary gate feeder. Linking elements center the basins and lock them into position, whereby the rotary gate feeder has a circular, closed rotary gate feeder geometry.

Depending on the tube neck, the tube or bottle closure may be a screw, snap, or clinch closure.

In the example of the dispenser of the invention, the tube neck is equipped with a re-circulation valve that can also be used as a container closure.

The geometry of the valve body is also simultaneously the sealing element for the rotary gate feeder, the bottle or tube, and the atmosphere. The slotted discharge geometry only allows the product to flow through in the direction of the metering chamber under pressure and closes against reverse pumping via the residual stress in the tube.

The material of the valve body consists of soft, flexible synthetic plastic to guarantee the sealing functions for the tube, the rotary gate feeder, and the atmosphere.

Upon squeezing the tube wall, the product is pressed through the valve slot and flows to the intake valve on the rotary gate feeder or the metering chamber. If the product pressure buildup should subside, the valve closes.

The two subassemblies, the rotary gate feeder with the tube or bottle closure and the tube with the re-circulation valve, produce the dispenser system for the squeeze container.

The initial seal tension between the two subassemblies arises by snapping the rotary gate feeder subassembly on the tube neck together with the integrated seal body as a discharge valve.

With this structure, the dispenser of the invention can also be sold on the market without an additional protective cap because the intake and discharge valve seals and guarantees additional product protection.

In the process, snap fittings affix the discharge valve to the rotary gate feeder. This has the advantage of being a simple and cost-effective assembly.

Another example is designed such that the tube neck area of this tubal system differs from that of commercially available tubes. It is different in that the tube neck area receives the twistable rotary gate feeder.

The dispenser of the invention has fewer parts than the tube dispensers known from the prior art. Integrating the tube neck into the metering significantly reduces the number of parts in the system.

The one-piece, round rotary gate feeder with integrated valves and sealing functions, including against tube opening and the displacement plunger, is mounted directly inside the tube neck. It is clipped or snapped onto it.

The tube is sealed shut by the non-detachable but twistable link between the rotary gate feeder and the tube neck and it can only be opened or closed by manually twisting the rotary gate feeder.

With this construction, there are no screw cap parts or tube valve parts because these functional components are integrated on the tube neck or rotary gate feeder. The intake and discharge valve in the rotary gate feeder take on the function of the re-circulation valve A tube can be linked to the tube neck, whereby the link is established by screwing or clipping. In this case, the tube neck has an integrated re-circulation valve and the rotary gate feeder consists of two basins, a plunger, and an intake and discharge valve.

For that purpose, the tube neck has a rotary gate feeder anchor, whereby the re-circulation valve is integrated into the tube neck. The rotary gate feeder, consisting of the two basins and the intake and discharge valve as well as the plunger, can, for example, be clipped into the rotary gate feeder anchor as a unit as a unit.

In another example, the rotary gate feeder has a convex discharge valve and a spherical plunger. The advantage of this is that the convex discharge valve and the spherical plunger make it possible to completely empty the metering chamber and no cream is left behind in the edge areas.

The one-piece rotary gate feeder has a valve endpiece and the fastener and the tube with mounted re-circulation valve. The valve endpiece and the fastener are produced for the tube and also for the tube neck.

BRIEF DESCRIPTION OF THE DRAWINGS

Additional benefits, characteristics, and details of the invention can be found in the following description of preferred examples and on the basis of the drawings. They depict as follows.

DETAILED DESCRIPTION

Figure 1:
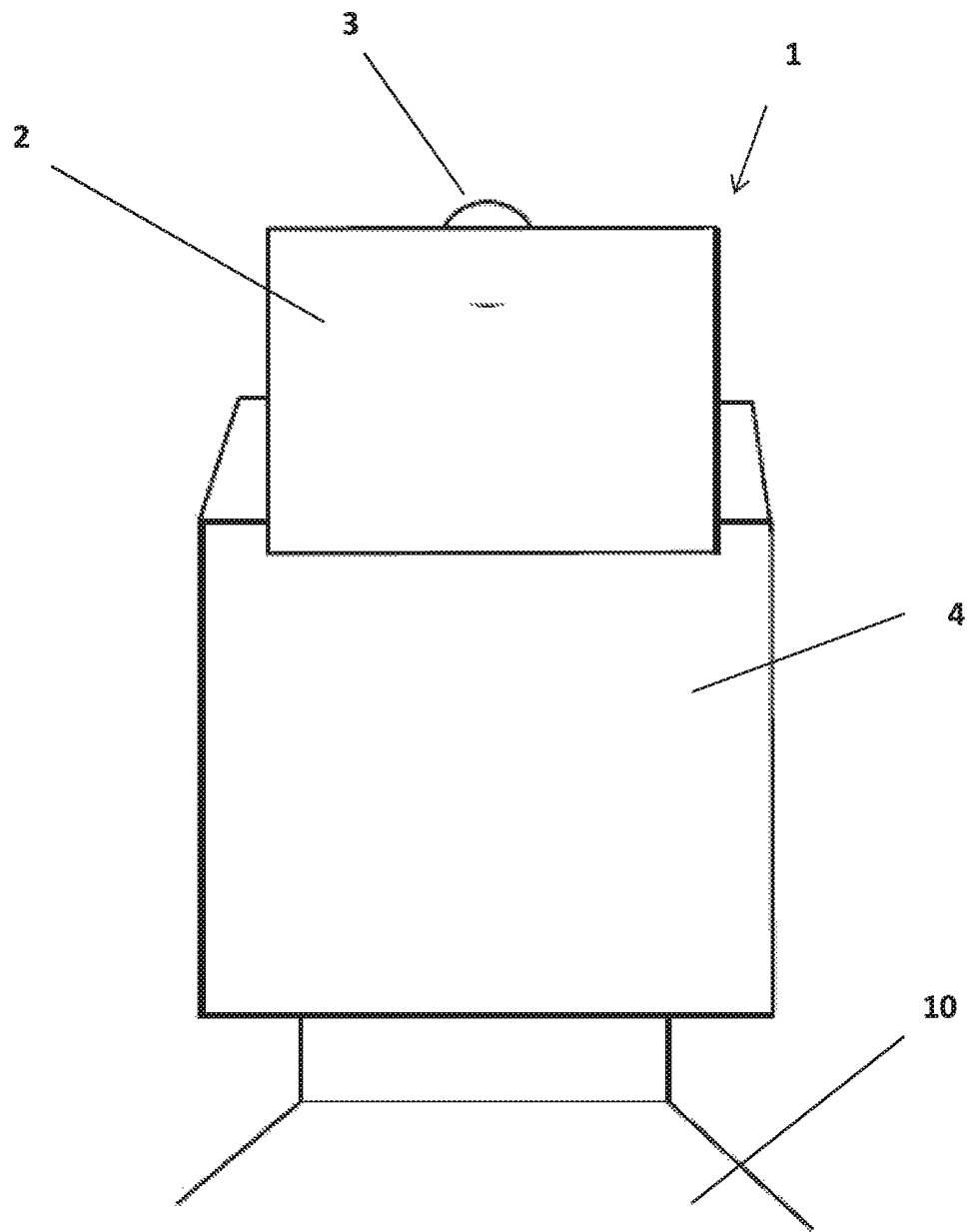
FIG. 1 is a perspective view of a dispenser in accordance with the present invention.

FIG. 1 shows the view of the dispenser 1 with the rotary gate feeder 2, the plunger 3, the fastener 4, and the tube or bottle neck 10.

Figure 2:
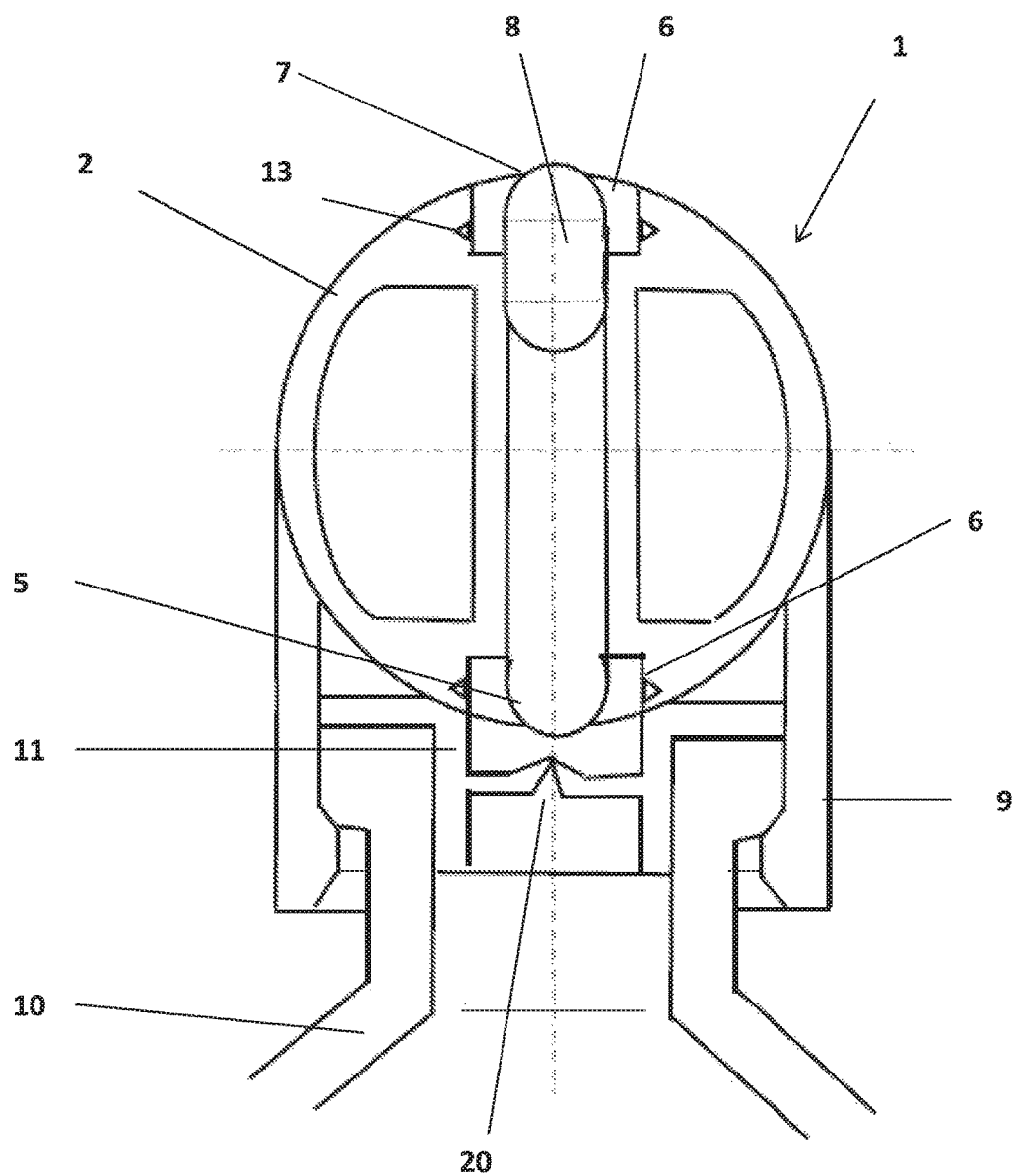
FIG. 2 is a cross section view of the dispenser of FIG. 1.

FIG. 2 shows a cross section of the dispenser 1, the one-piece rotary gate feeder 2, which is represented with the fixed and snapped-in intake and discharge valves 6 with outlet openings 7 and the plunger 8 as a cylindrical plunger variant. The snap fastener 9, which includes the complete rotary gate feeder. The product-directing 20 re-circulation valve 11 is integrated into the tube or bottle neck 10. Additionally, a metering chamber that is not identified more specifically is shown, which would hold the cream or the gelatinous product.

Figure 3:
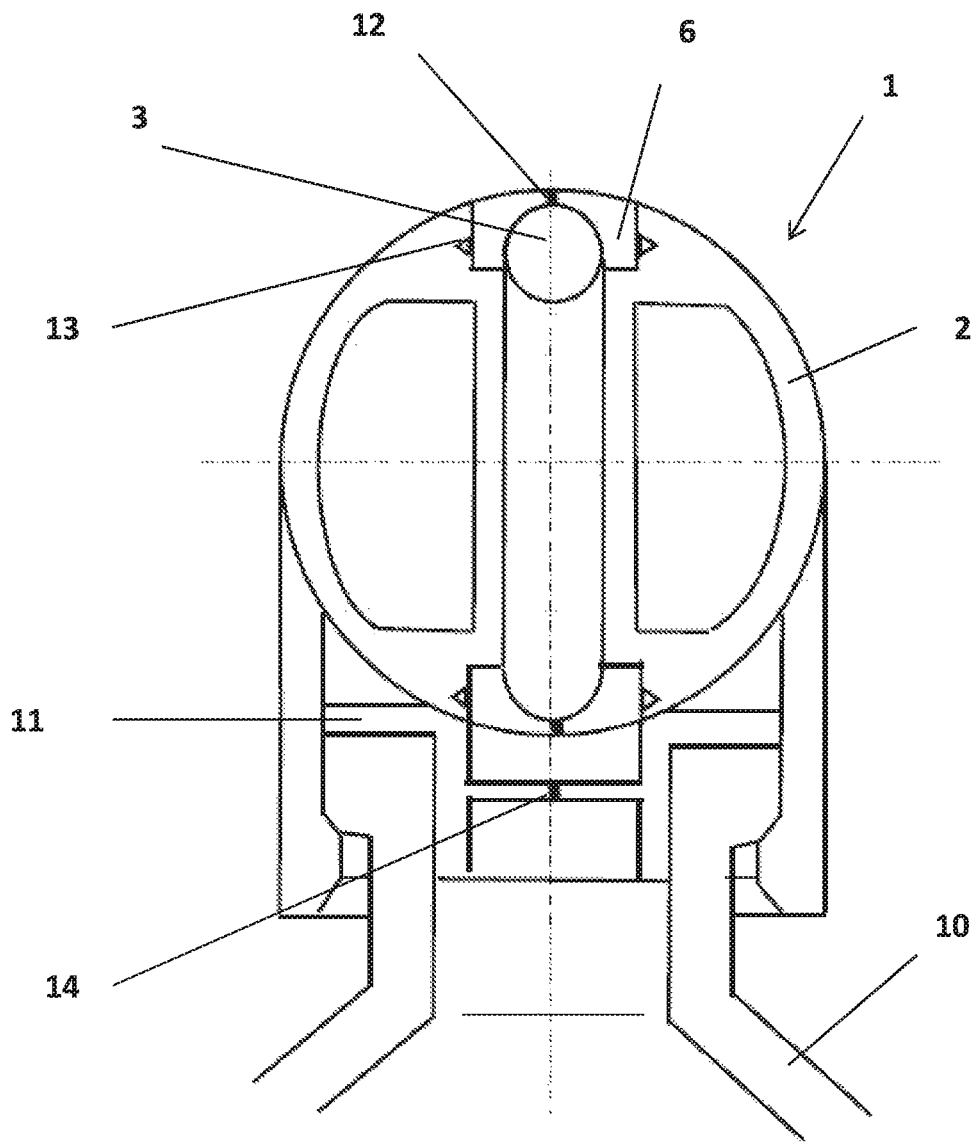
FIG. 3 is a cross section view of the dispenser of FIG. 1 in the closed position.

FIG. 3 shows a cross section of the dispenser 1 as a closed variant, i.e., the plunger 8 that abuts the plunger seal seat 5, whether spherical or cylindrical, runs toward the slotted outlet wall 12 in the intake or discharge valve 6. The snap elements 13 brace the discharge valve 6 with the rotary gate feeder 2. The bottle or tube neck 10 is provided a slotted re-circulation valve 11. The slot 14 is clearly visible here.

Figure 4:
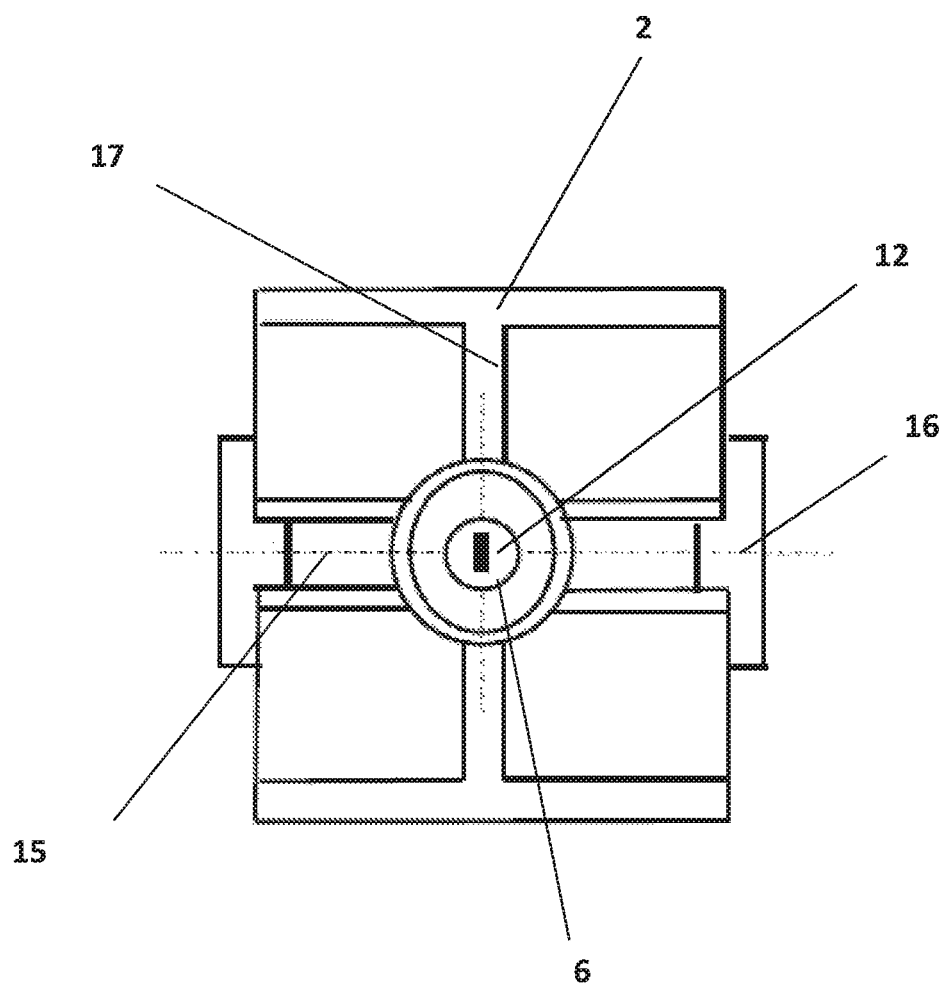
FIG. 4 shows a horizontal section of the dispenser of the present invention.

FIG. 4 shows a horizontal section in the area of the rotary gate feeder 2 as a T-shaped geometry 17, the slotted intake or discharge valve 6 with the slot 12, and the axis mounting 15 and axis with fastener wall 16.

Figure 5:
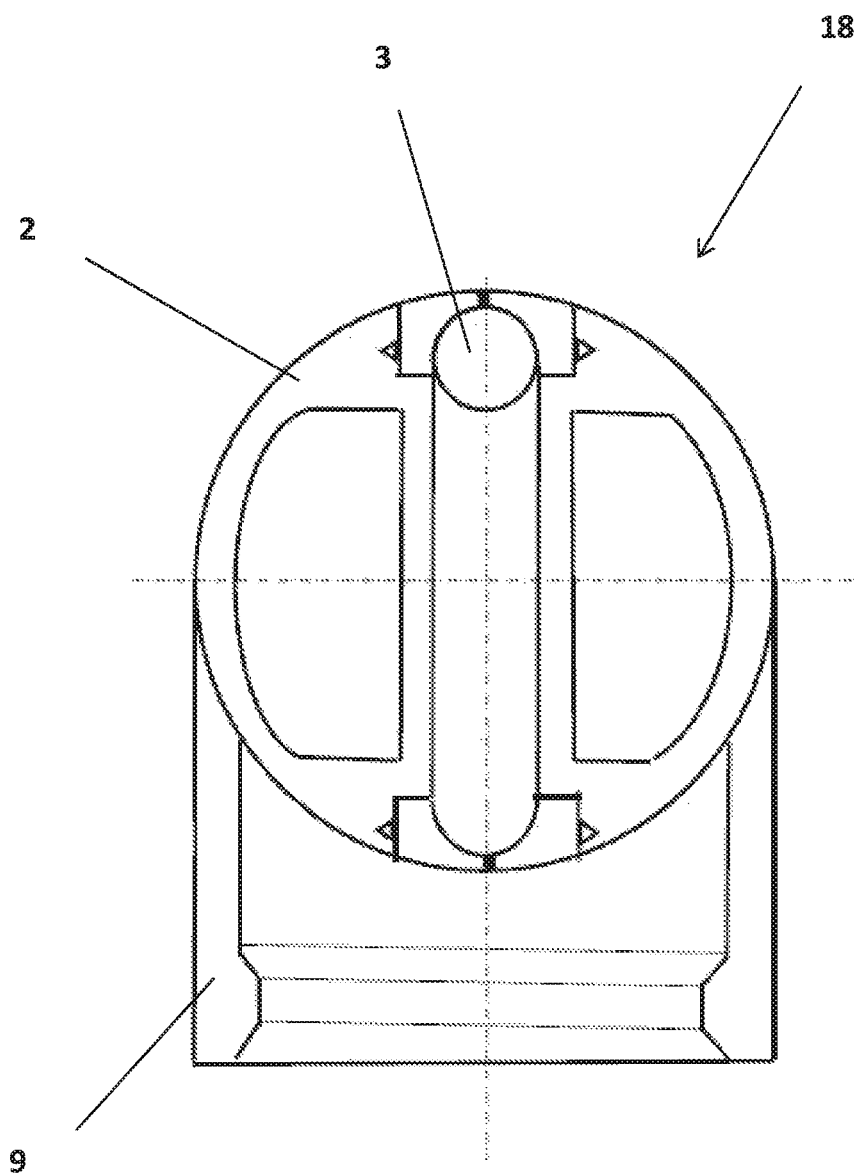
FIG. 5 shows a subassembly of the dispenser of the present invention.

FIG. 5 shows the subassembly 18, rotary gate feeder 2 with fastener 9 in cross section with the plunger 3 in the seal seat 5.

Figure 6:
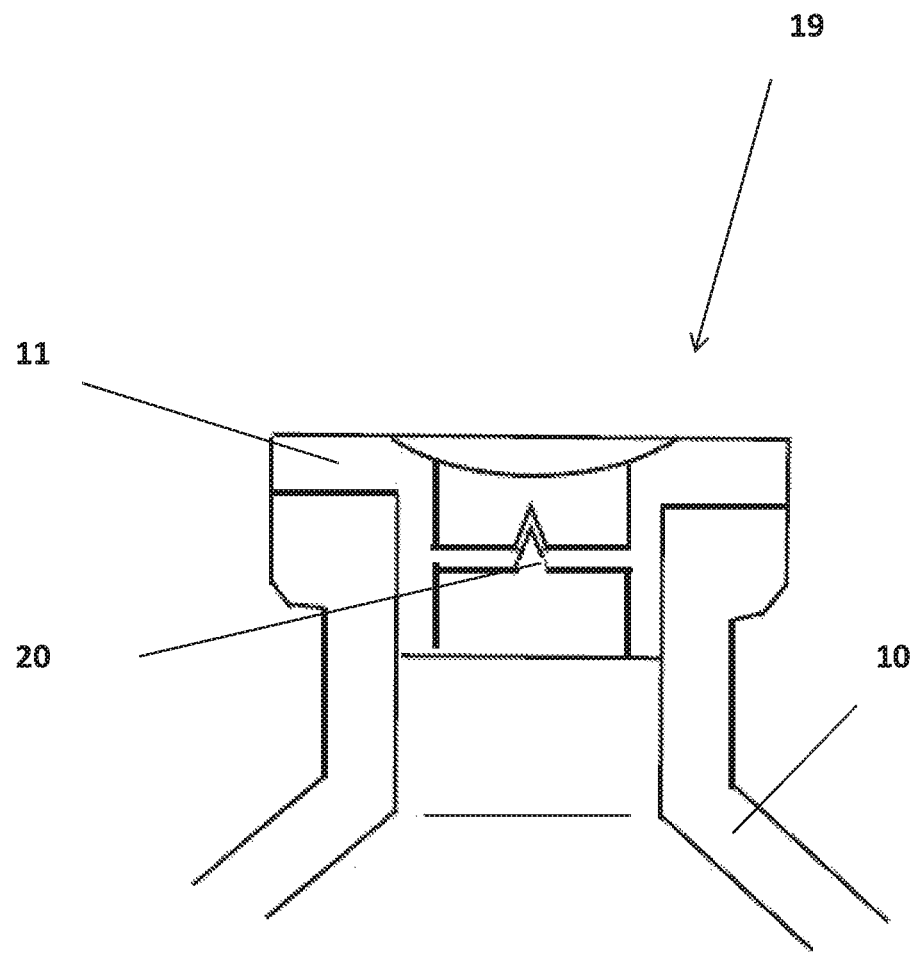
FIG. 6 shows a further subassembly in combination with a tube neck.

FIG. 6 shows the subassembly 19 with the bottle or tube neck 10 and the re-circulation valve 11 as a flow-aligned variant 20.

Figure 7:
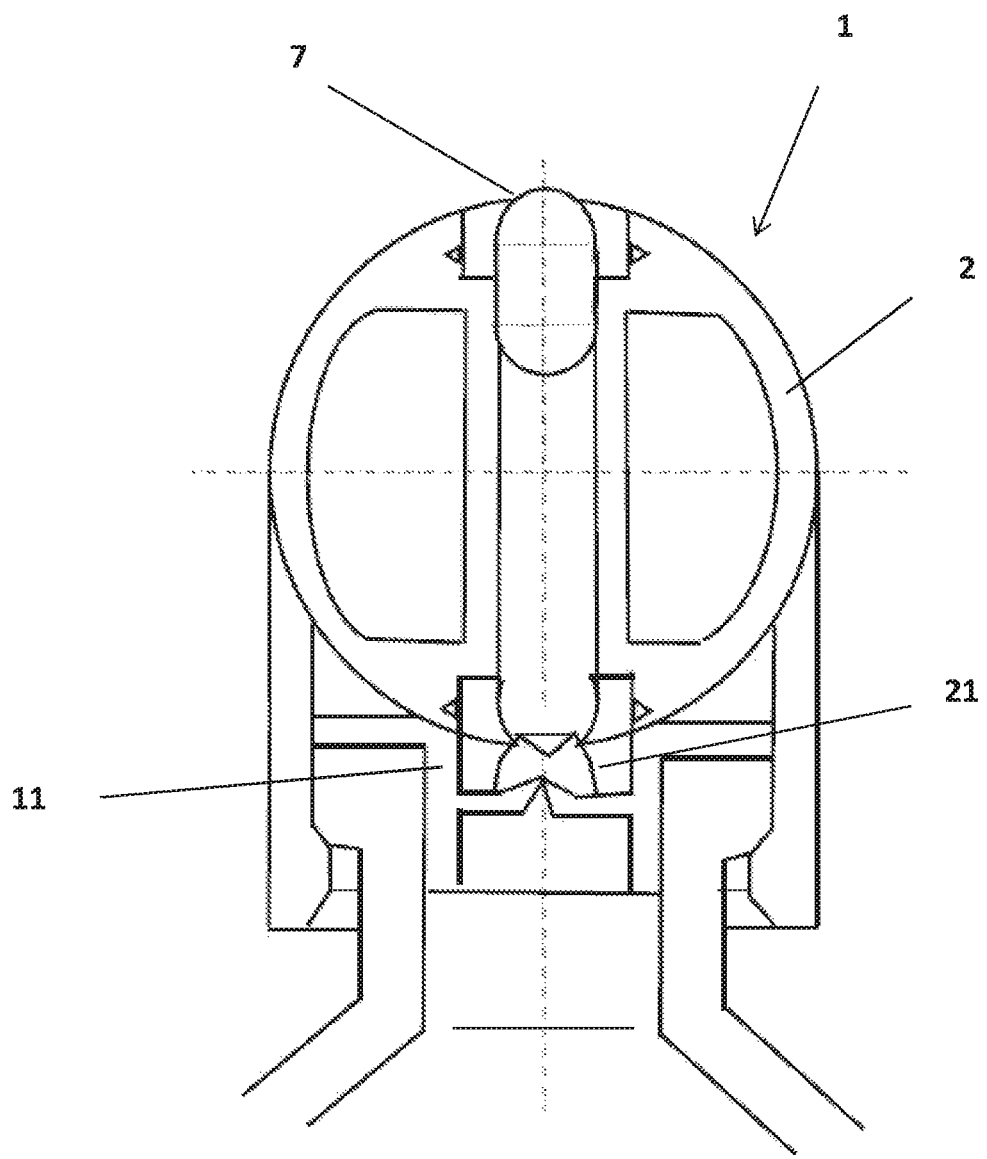
FIG. 7 shows a cross section of the dispenser and tube in the open position.

FIG. 7 shows a cross section of the open variant 7 of the dispenser 1 with a shearing, sealing, and latching element 21 for the rotary gate feeder 2 in the re-circulation valve 11 in order to shear off the extracted product thread of cream or gelatinous product in the metering chamber upon twisting the rotary gate feeder 2.

Figure 8:
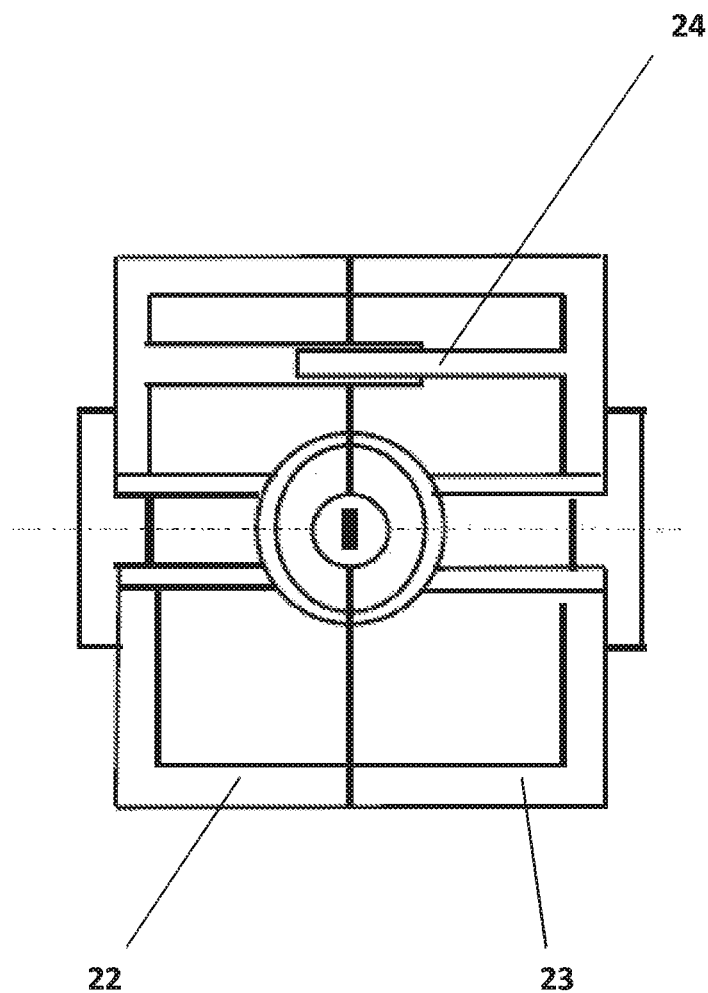
FIG. 8 shows a horizontal section of FIG. 7.

FIG. 8 shows a horizontal section of a variant whereby the rotary gate feeder 2 is constructed of two basins 22 and 23. The basins 22, 23 are held together with the half basin linking elements 24. In this version, a separation is visible on the outer area of the rotary gate feeder 2.

Figure 9:
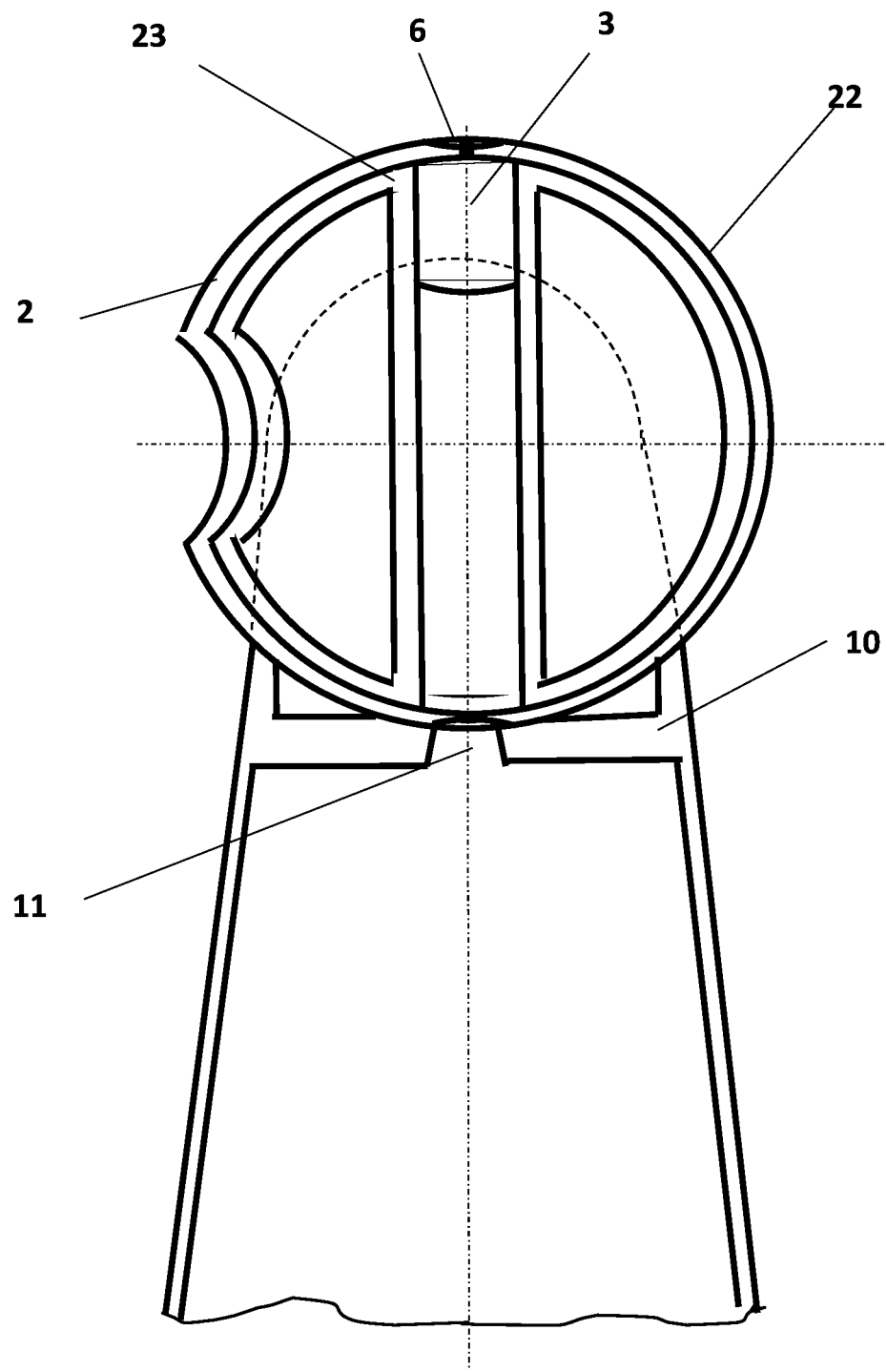
FIG. 9 shows a longitudinal section.

FIG. 9 shows an example in longitudinal section through the tube with the re-circulation valve 11 integrated into the tube neck 10. The rotary gate feeder 2 is with the basins 22 and 23 and the plunger 3 and the intake and discharge valves 6.

Figure 10:
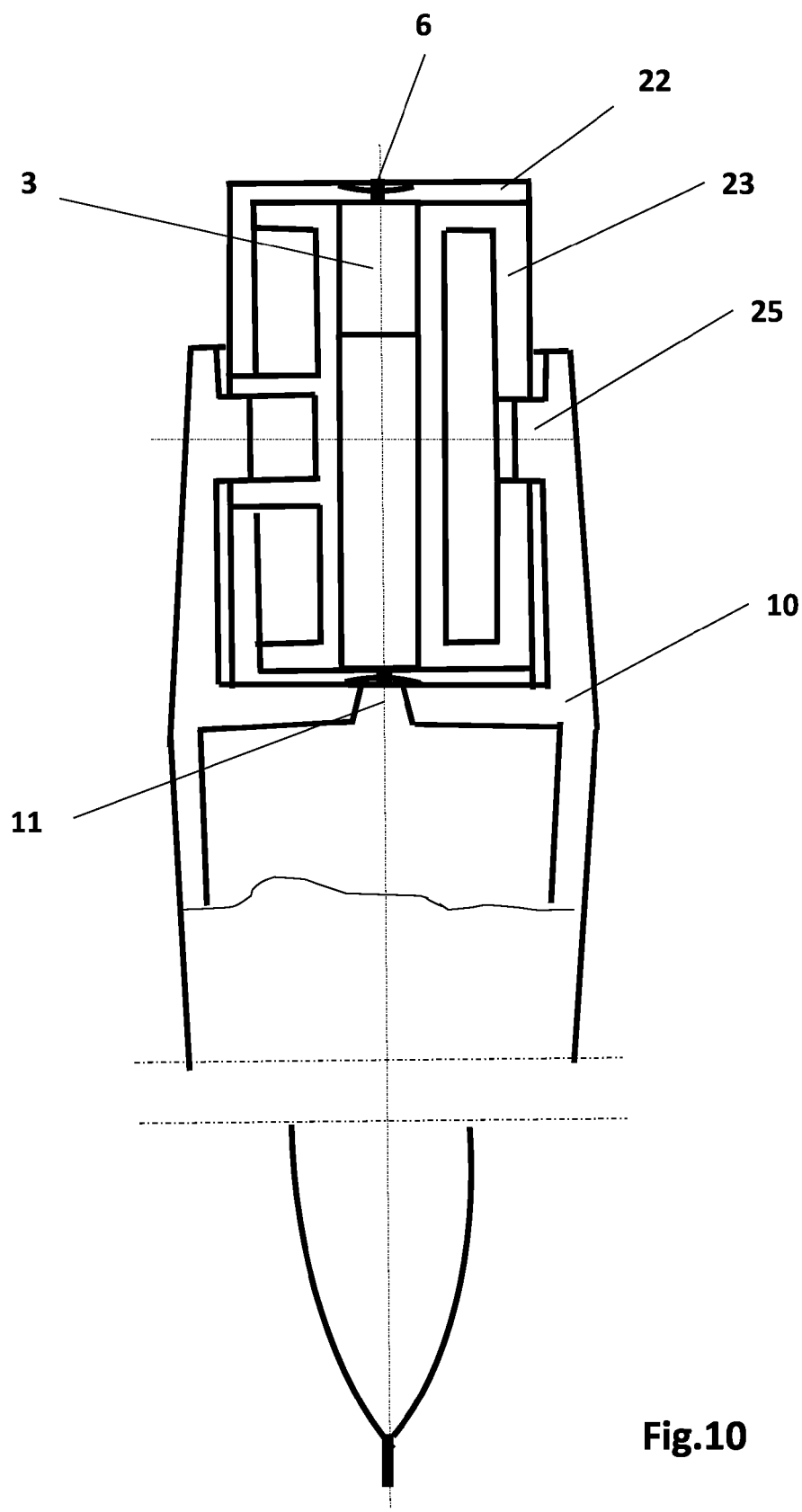
FIG. 10 shows a cross section of FIG. 9.

FIG. 10 shows FIG. 9 in cross section through the tube neck 10 with the rotary gate feeder brace 25 and the integrated re-circulation valve 11 in the tube neck 10. The rotary gate feeder 2 with the two basins 22 and 23 and the intake and discharge valve 6 as well as the plunger 3 integrated into the tube neck 10.

Figure 11:
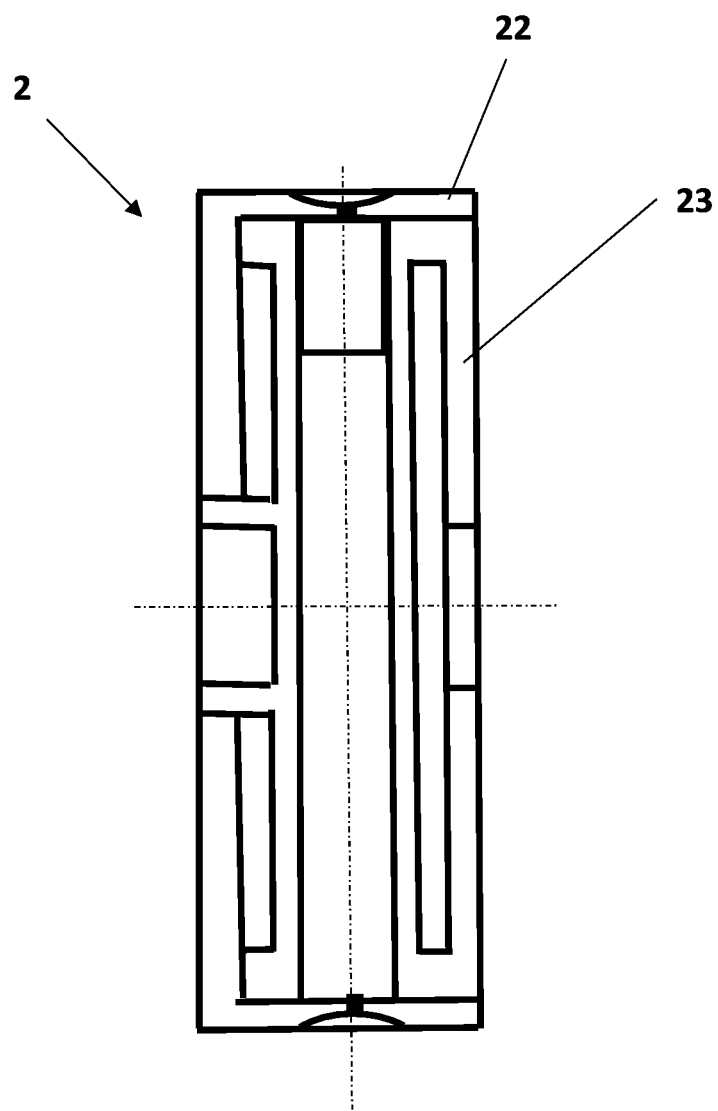
FIG. 11 shows a cross section through a rotary gate feeder.

FIG. 11 shows a cross section through the rotary gate feeder 2 with the two basins 22 and 23.

Figure 12:
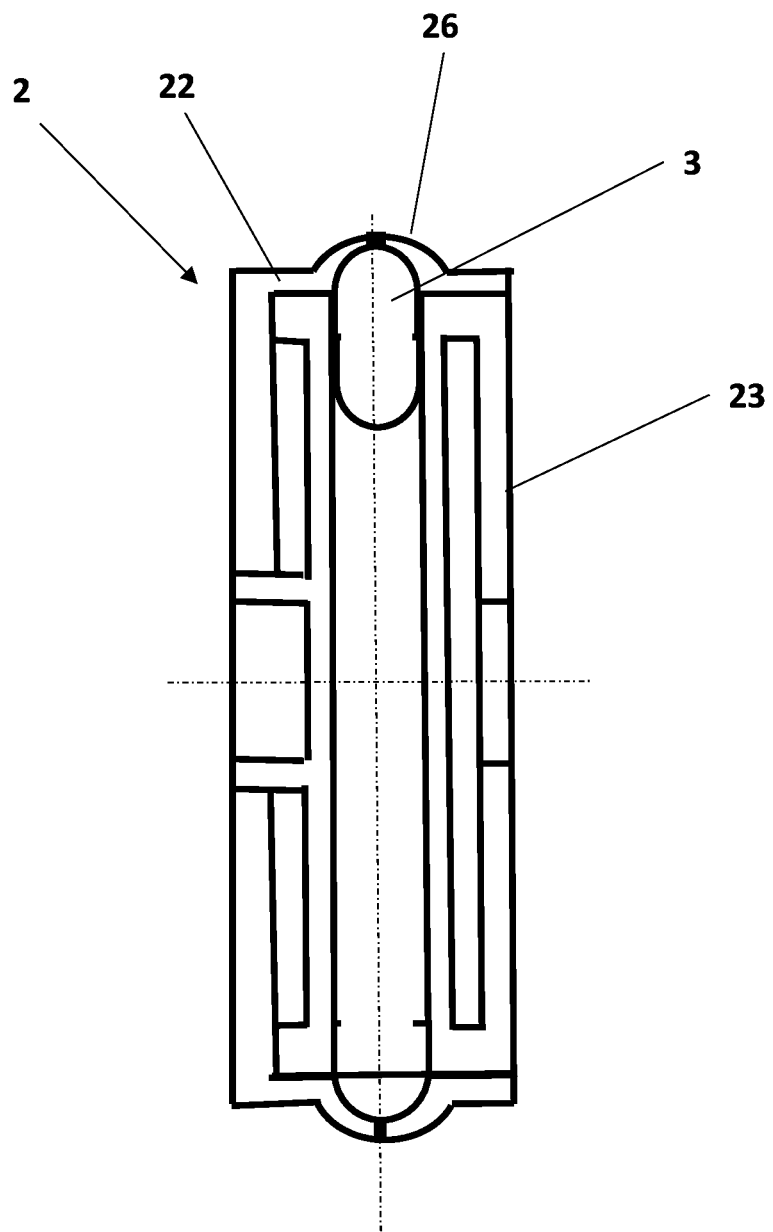
FIG. 12 shows a cross section through a rotary gate feeder variant.

FIG. 12 shows a cross section through a rotary gate feeder variant with the basins 22 and 23 with a convex discharge valve 26 and spherical plunger 3. As such, the spherical plunger 3 is not spherical unto itself but rather has a rounded end area that works in conjunction with the intake and discharge valve 6 in the particular position of the rotary gate feeder 2. In this context, working in conjunction means that the spherical plunger 3 engages with its rounded end areas in a form-locking manner in the intake and discharge valve 6 and extracts the cream or gelatinous product from the metering chamber in the extraction position.

Extraction position means that the rotary gate feeder 2 with the discharge valve is directed away from the tube and the intake valve is directed toward the tube, whereby the cream or gelatinous product is already in the metering chamber and is pressed by the rounded plunger 3 out of the discharge valve, whereby the intake and discharge valve 6 is slotted and consequently flexible, which enables the form closure between the rounded plunger 3 and the intake and discharge valve 6.

Figure 13:
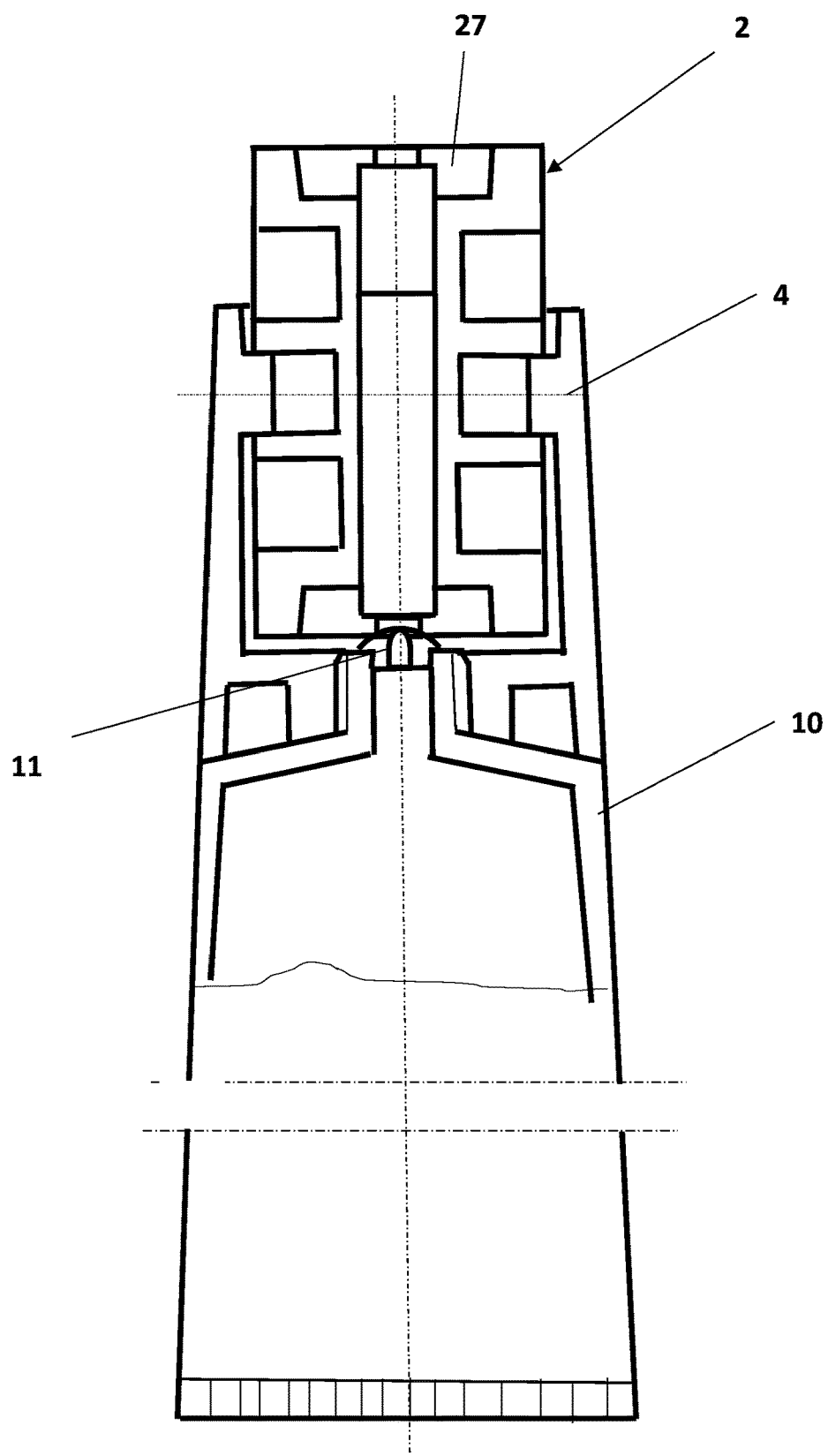
FIG. 13 shows a cross section of a one piece rotary gate feeder mounted to a tube and recirculation valve.

FIG. 13 shows a cross section of a one-piece rotary gate feeder 2 with the endpiece 27, the fastener 4, and the tube 10 with mounted re-circulation valve 11.

Figure 14:
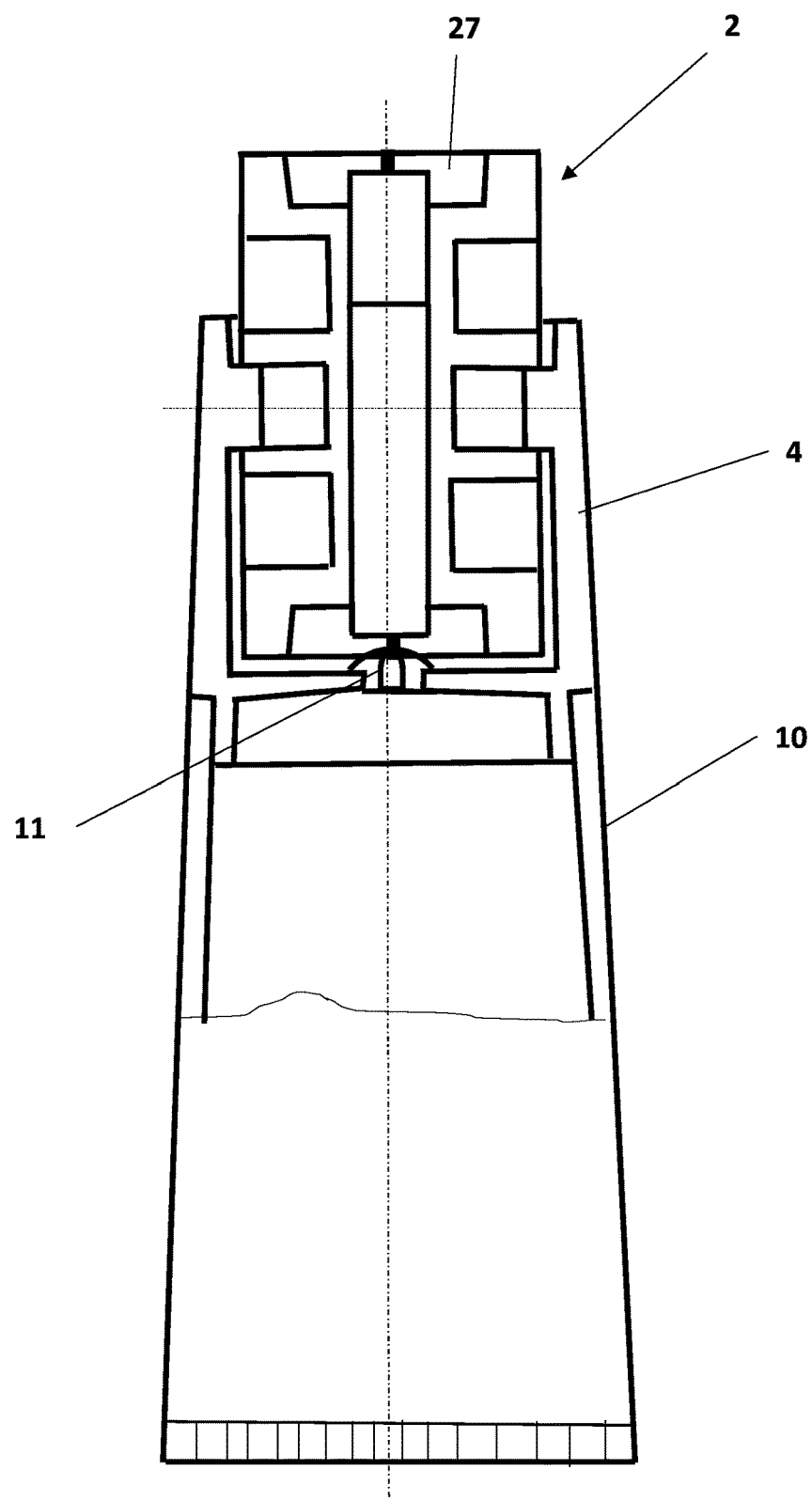
FIG. 14 shows a cross section of a one-piece rotary gate feeder in combination with a tube neck.

FIG. 14 shows a cross section of a one-piece rotary gate feeder 2 with the valve endpiece 27 and the fastener 4, which also produces the tube neck 10 for the tube.

The invention claimed is:

1. A thread dosing feeder for extracting creams or gelatinous products contained within a tube from the tube, wherein the dosing feeder can be applied to the tube, the thread dosing feeder comprises a rotary gate feeder (1), the rotary gate feeder (1) has a metering chamber, the metering chamber operates in conjunction with a plunger (3), the rotary gate feeder (1) is pivot-mounted on the thread dosing feeder and the thread dosing feeder has an outlet, wherein the thread dosing feeder has a check valve (11, 14, 20), the rotary gate feeder (1) has a concave finger receptor, wherein the metering chamber has at least one intake/discharge valve (6), the at least one intake/discharge valve (6) comprising a slot (12), the rotary gate feeder (1) consists of a first basin (22) and a second basin (23) whereby the first basin (22) and the second basin (23) are connected to one another by means of basin linking elements, and wherein the check valve (11) is arranged inside a tube neck (10) and comprises a sealing, shearing, and latching element in the tube neck (10).

2. A thread dosing feeder according to claim 1, wherein the plunger (3) is cylindrical.

3. A thread dosing feeder according to claim 2, wherein the plunger (3) has rounded end areas.

4. A thread dosing feeder according to claim 1, further comprising a convex discharge valve (26).

5. A thread dosing feeder according to claim 1, wherein the rotary gate feeder (2) has two intake/discharge valves (6).

6. A thread dosing feeder according to claim 5, wherein the two intake/discharge valves (6) are positioned at opposite ends of the metering chamber.

7. A thread dosing feeder according to claim 1, wherein the slot (12) of the intake/discharge valve (6) is flexible so as to act as an inlet when the intake/discharge valve (6) is aligned toward the tube, and to act as an outlet when the intake/discharge valve (6) is aligned away from the tube.

8. A thread dosing feeder according to claim 1, wherein the check valve comprises a slotted valve (14).

9. A thread dosing feeder according to claim 1, further comprising snap elements (13) for holding the intake/discharge valve (6) in place in the rotary gate feeder (1).

* * * * *